(12) United States Patent
Stoklosa

(10) Patent No.: US 8,127,457 B2
(45) Date of Patent: Mar. 6, 2012

(54) TOOL, METHOD AND MARKING SYSTEM

(76) Inventor: Anna Stoklosa, Maple (CA)

( * ) Notice: Subject to any disclaimer, the term of this patent is extended or adjusted under 35 U.S.C. 154(b) by 312 days.

(21) Appl. No.: 12/385,383

(22) Filed: Apr. 7, 2009

(65) Prior Publication Data

US 2009/0255138 A1      Oct. 15, 2009

(30) Foreign Application Priority Data

Apr. 14, 2008   (CA) .................................. 2625566

(51) Int. Cl.
    *B43L 13/00* (2006.01)
    *B25H 7/00* (2006.01)
    *G01B 1/00* (2006.01)

(52) U.S. Cl. ............... 33/32.2; 33/527; 33/679

(58) Field of Classification Search ............ 33/1 K, 33/18.1, 19.1–19.3, 32.1–32.3, 34, 35, 40, 33/483, 484, 526, 527, 666, 677, 679, 574, 33/577, 579, DIG. 20
See application file for complete search history.

(56) References Cited

U.S. PATENT DOCUMENTS

| | | | | |
|---|---|---|---|---|
| 1,370,645 A * | 3/1921 | Hawkes | ........................ | 33/679 |
| 1,927,992 A * | 9/1933 | Pulver | ........................ | 33/679 |
| 1,932,659 A * | 10/1933 | Granite | ........................ | 125/23.01 |
| 2,588,757 A | 3/1952 | Peeples, Jr. | | |
| 2,726,451 A * | 12/1955 | Johnson | ........................ | 33/23.03 |
| 3,197,874 A * | 8/1965 | Fox | ........................ | 33/194 |
| 3,434,218 A * | 3/1969 | Potter | ........................ | 33/503 |
| 3,744,141 A * | 7/1973 | Strickland, Sr. | ........................ | 33/526 |
| 4,553,327 A * | 11/1985 | Watanabe | ........................ | 33/32.2 |
| 4,558,522 A * | 12/1985 | Lance | ........................ | 33/443 |
| 4,713,887 A * | 12/1987 | Kitamura | ........................ | 33/1 M |
| 4,860,723 A * | 8/1989 | Fortin | ........................ | 125/23.01 |
| 6,305,090 B1 * | 10/2001 | Julien | ........................ | 33/41.5 |
| 6,694,633 B1 * | 2/2004 | Nyquist | ........................ | 33/452 |
| 6,796,049 B1 * | 9/2004 | Claxton | ........................ | 33/527 |
| 7,010,861 B2 * | 3/2006 | Nicholson | ........................ | 33/42 |

* cited by examiner

*Primary Examiner* — Amy Cohen Johnson

(57) ABSTRACT

The present invention pertains generally to marking and/or measuring surfaces adjacent to the curved and/or off angle object's surface, positioned perpendicularly to the working surface or positioned on the same surface plane as the object's surface. Particularly, the present invention should and/or will be useful for the hardwood/laminate/parquet/engineering flooring installers and/or any kind of residential and/or commercial construction workers and/or for amateur performers. As the level of difficulty during the wood flooring installation around curved and/or off angle surfaces arises, and there are limited number of workers who can perform such trade, the TOOL, METHOD AND MARKING SYSTEM, will enable anyone who is familiar with the trade to perform the complicated assignment in a shorter period of time and without waste of material; moreover, it will allow performers to acquire the craftsmanship results.

3 Claims, 10 Drawing Sheets

Figure 1.1
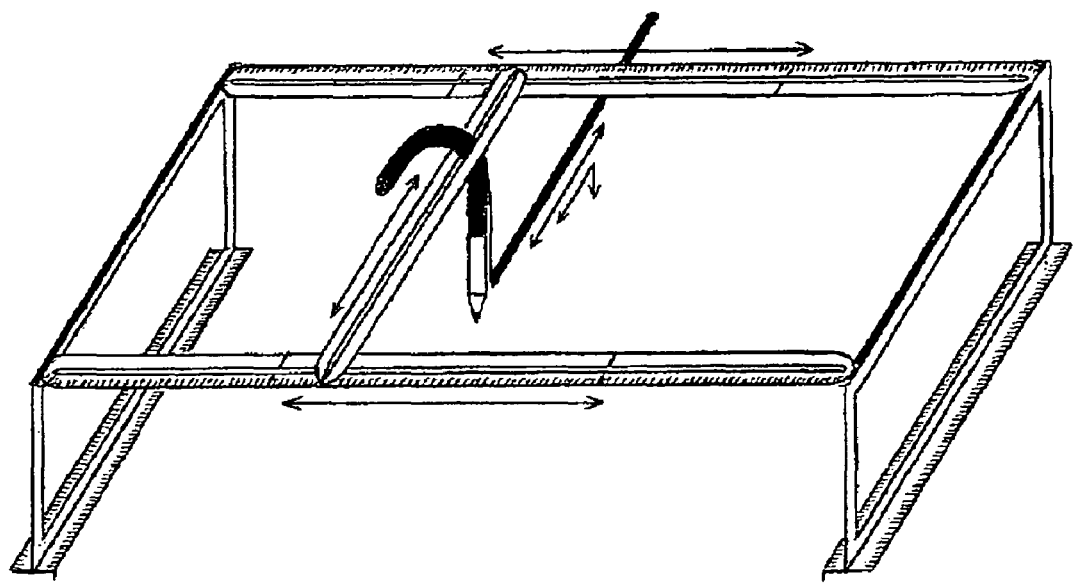

Figure 1.2
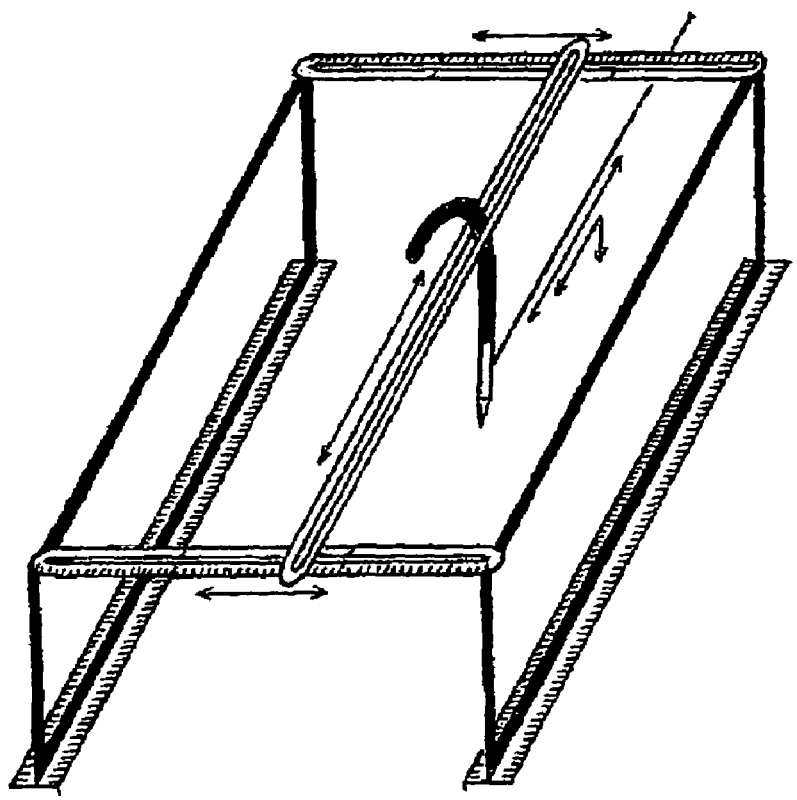

Figure 6.1
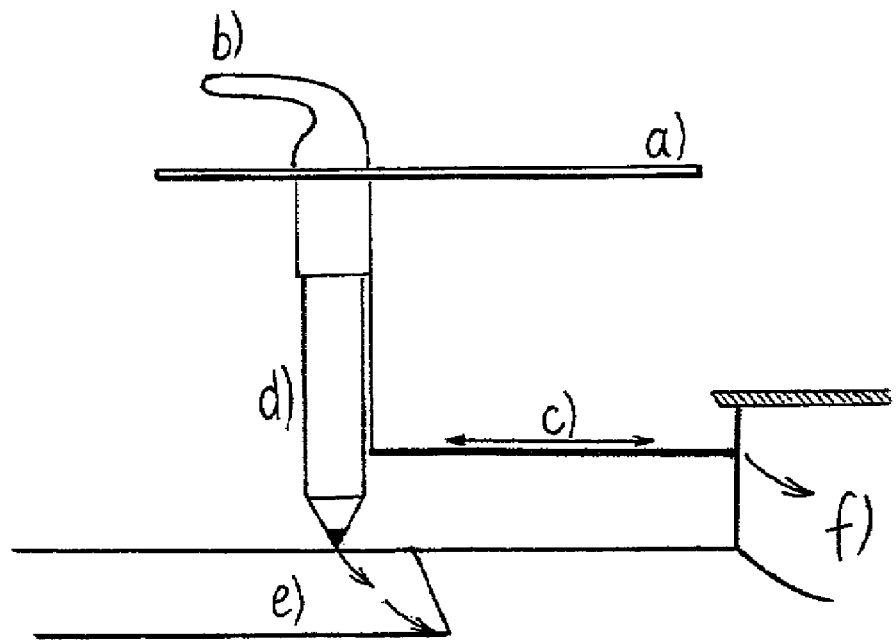
Figure 7.1
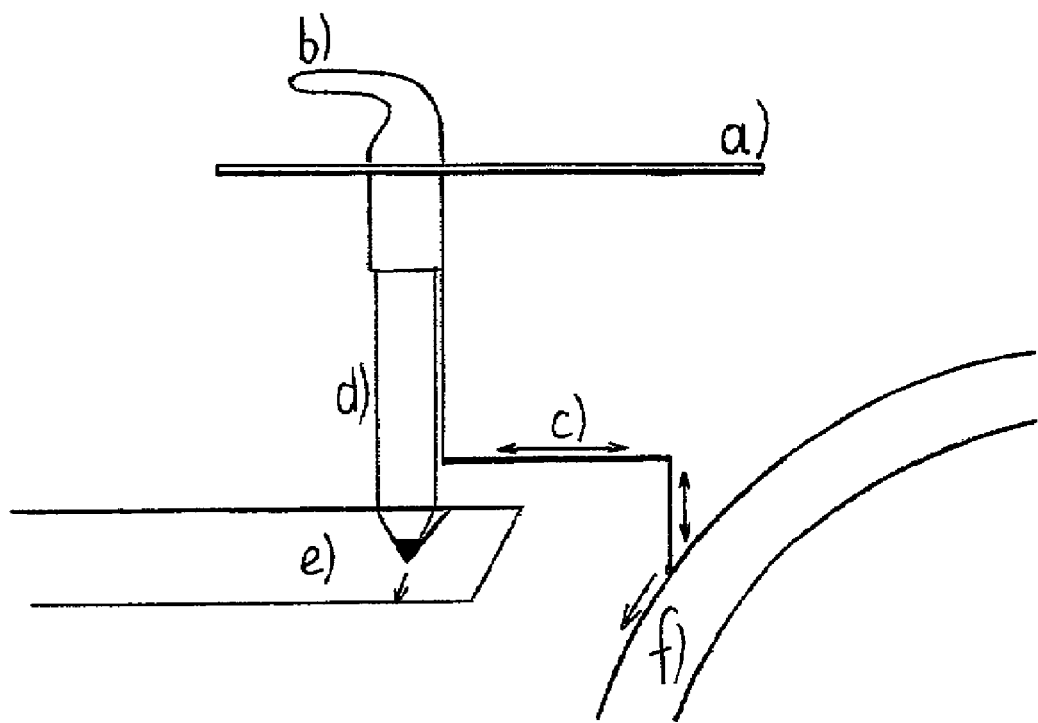

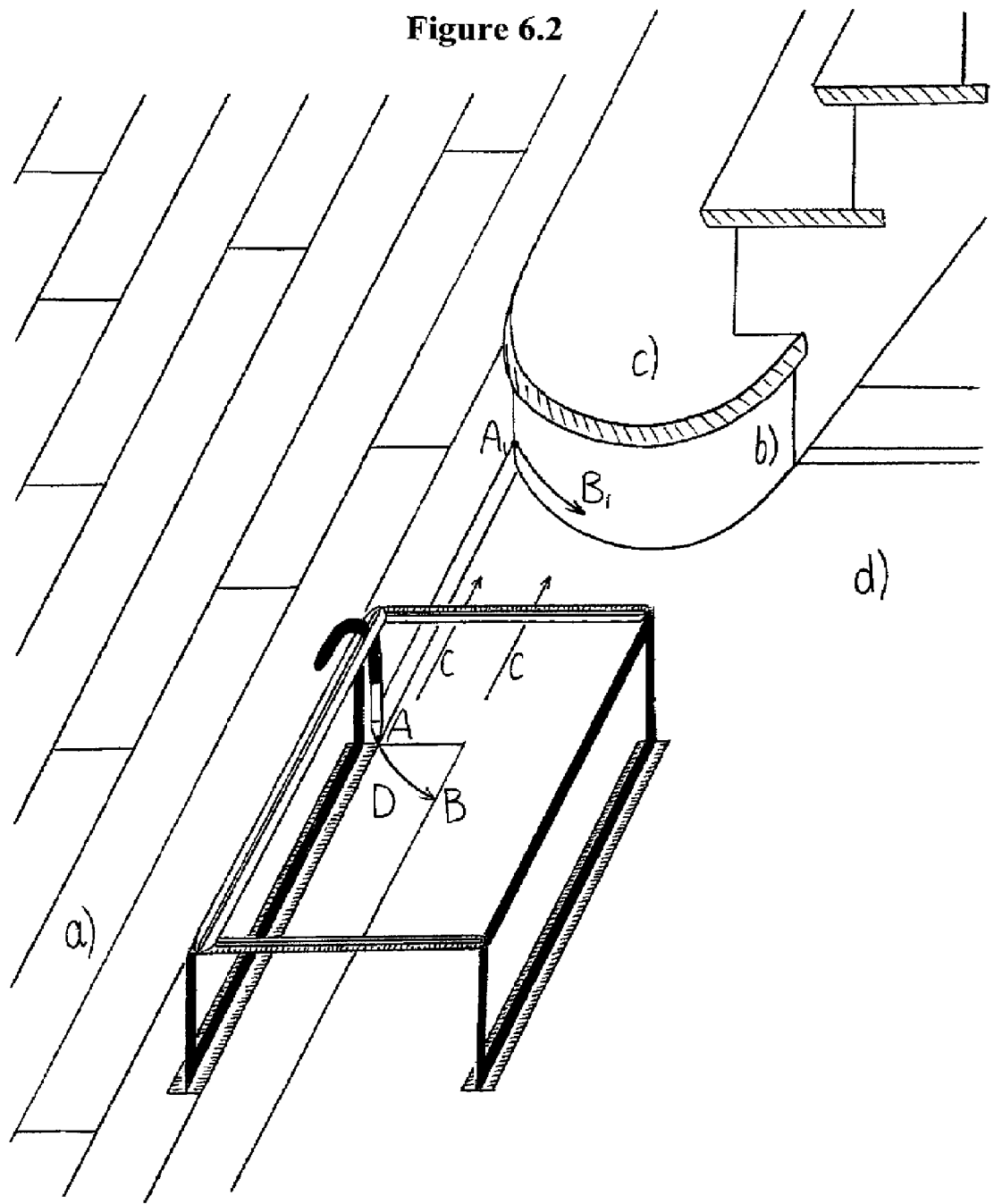
Figure 6.2

Figure 6.3
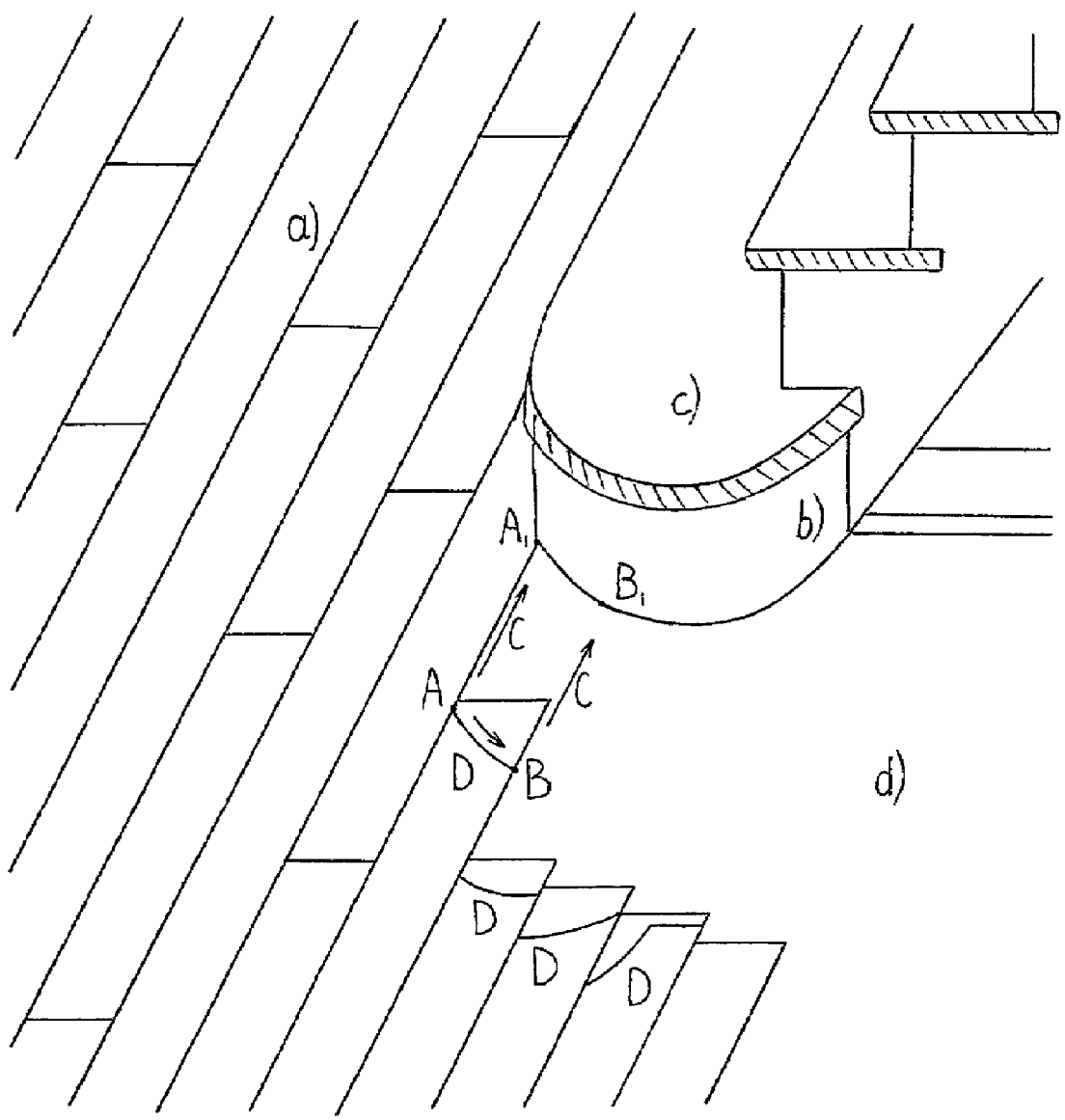

Figure 7.2
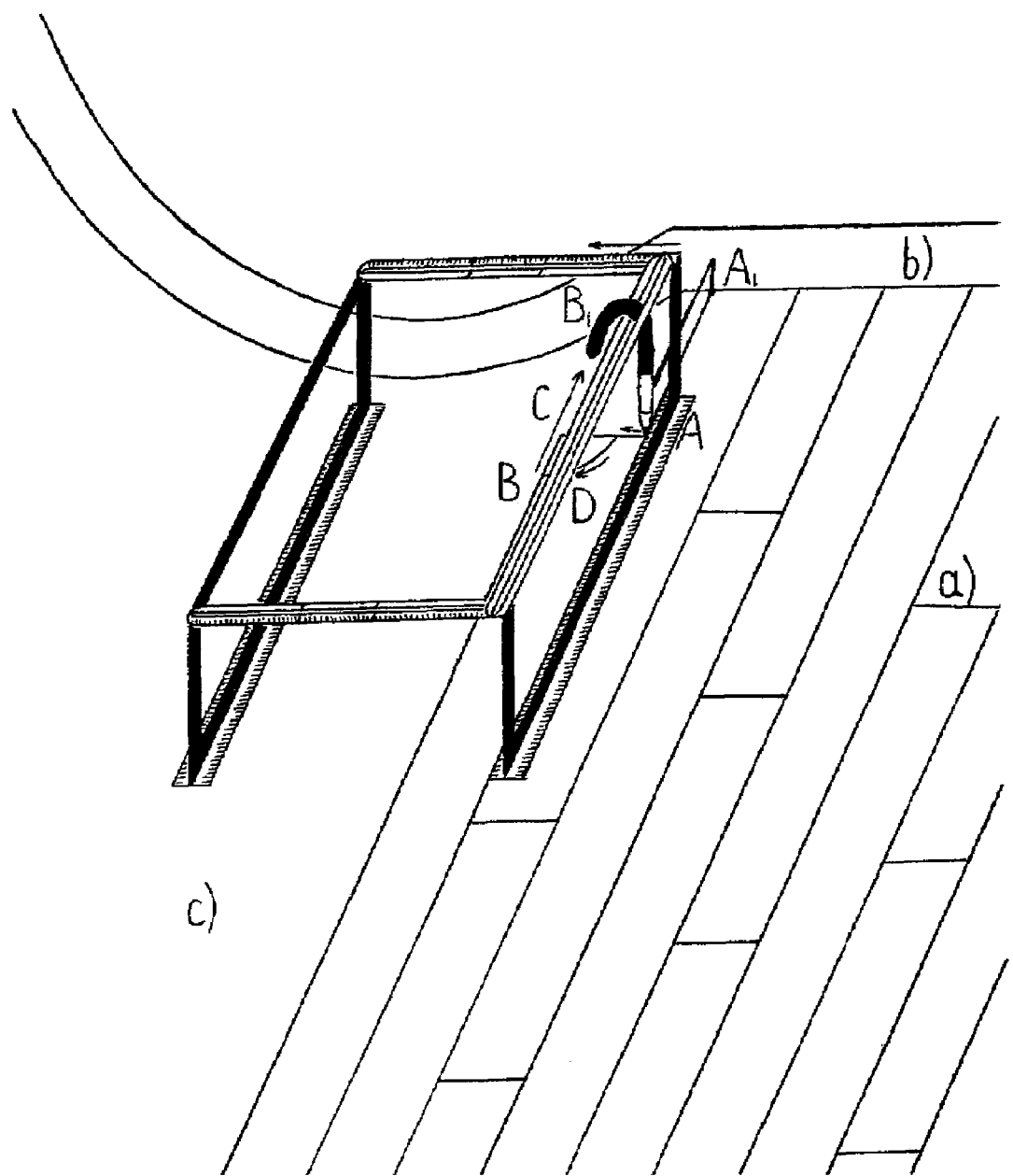

Figure 7.3
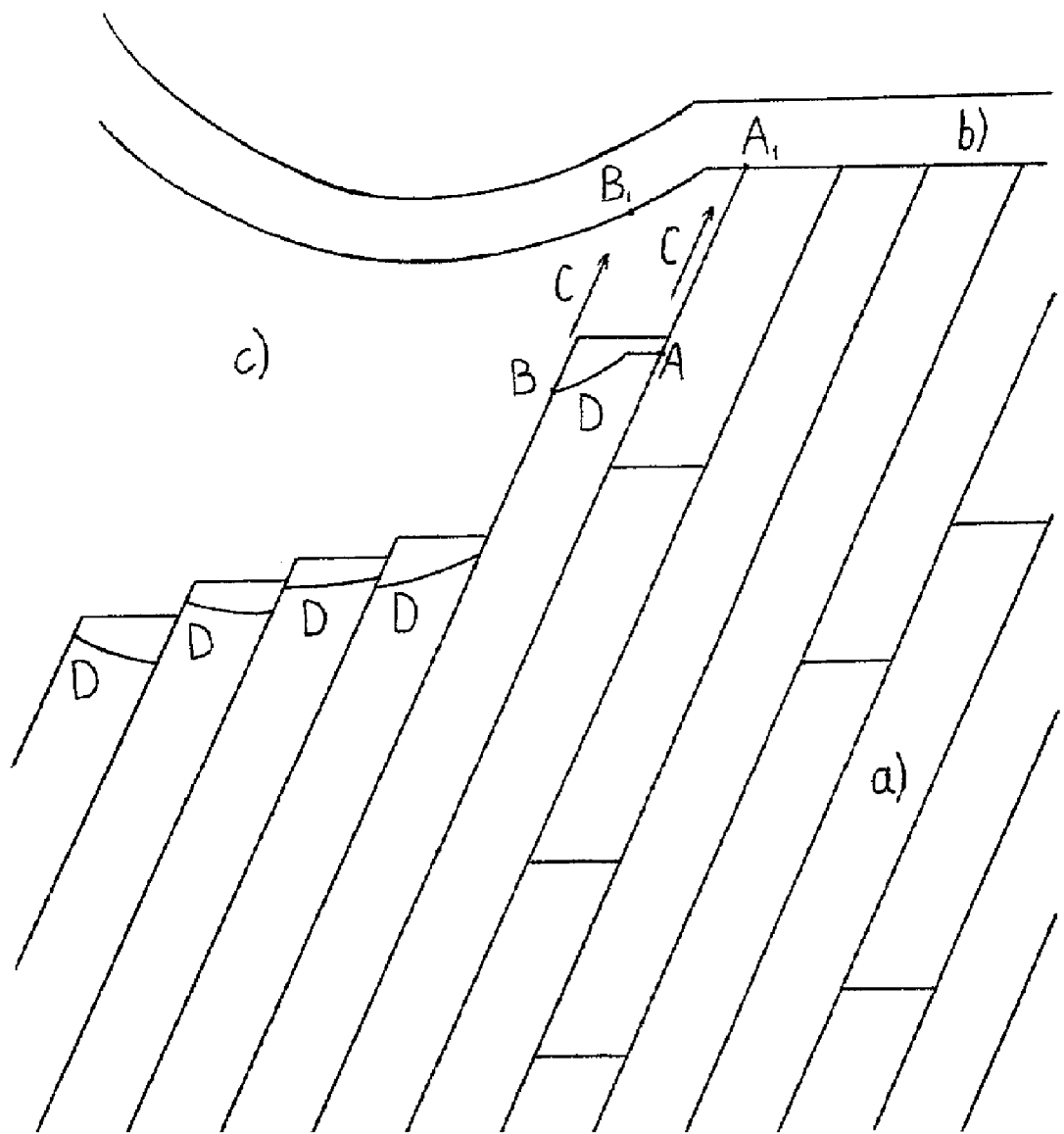

TOOL, METHOD AND MARKING SYSTEM

FIELD OF THE INVENTION

The present invention pertains generally to marking and/or measuring surfaces adjacent to the curved and/or off angle object's surface, positioned perpendicularly to the working surface or positioned on the same surface plane as the object's surface. Particularly, the present invention should and/or will be useful for the hardwood/laminate/parquet/engineering flooring installers and/or any kind of residential and/or commercial construction workers and/or for amateur users.

BACKGROUND OF THE INVENTION

In the field where one surface should align perfectly to the other surface either perpendicularly or positioned on the same surface plane as the object's surface, where the adjoining surface to the object's surface is shaped or off/angle, the actual work (drawing exact contour on a working surface and cutting it) is very complex. Many construction workers are struggling with performing the actual work correctly without the proper marking system, and/or they are omitting projects which involve complicated cuts on different surfaces (sometimes such job involves many different surfaces and/or cuts). Only craftsmen and/or skilled and/or determined people are able to perform the challenging, curved/off angle cutting job. Therefore, the job should be done ideally that anyone who looks at the performance should admire the craftsmanship of a particular worker. Workers are dealing with difficult cuts by using carpentry tools and/or by their own ways of simplifying the process of their work. In addition, it takes a great amount of time to complete curved/off angle cuts on a long/short and/or curved/off angle surface. Currently there is no device that is helping contractors and/or amateur workers by limiting time spent on difficult cuts and ideal aligning to the assigned surface. Although the professional has his/her working system, it takes several hours to draw and to cut the actual size of an adjacent surface to the perpendicular object's surface and/or to the object's surface positioned on the same plane level as the working surface, that will align ideally. The time contractors invest into the performance usually extends their originally scheduled time. Naturally, there is need to simplify the project and at the same time minimize the actual time consuming the assignment but also maximize the quality of the so called professional job and/or allow other contractor workers to be assigned and equipped to perform the assignment. It is an object of the present invention to provide such TOOL, METHOD AND MARKING SYSTEM, satisfying craftsmanship's and/or contractor worker's and/or amateur user's needs. Matter and advantages of the present invention will be apparent from the description of the invention provided herein.

REFERENCES APPLIED

| United States patents | | |
| --- | --- | --- |
| 6,305,090 | Oct. 23, 2001 | Julien |
| 2,588,757 | Mar. 11, 1952 | Peeples |

TOOL, METHOD AND MARKING SYSTEM may be similar to U.S. Pat. Nos. 6,305,090 and 2,588,757; in the context that all three compositions are tend to trace lines on specified surfaces and tend to have similar shape of the design.

The distinction between TOOL, METHOD AND MARKING SYSTEM and U.S. Pat. Nos. 6,305,090 and 2,588,757 are situated in the elements of patent:

UNIQUE—where scheme of TOOL, METHOD AND MARKING SYSTEM is designed to perform work on hardwood/laminate/engineering/parquet flooring with its composition of marking and/or measuring object to perform its job by movement/marking/measuring unit in all directions and with adjustable frame system to satisfy need of the performer, where U.S. Pat. Nos. 6,305,090 and 2,588,757 are limited to its scope (the function is: tile marking system).

USEFUL—where TOOL, METHOD AND MARKING SYSTEM has a wide variety of performance on different surfaces and while different cuts (curved, off angled, or straight), and extensions/flexibility of use of the frame system, marking scheme, and measuring system to achieve the ideal performance; where U.S. Pat. Nos. 6,305,090 and 2,588,757 are limited to its scope (the function is: tile marking system).

INVENTIVE—where TOOL, METHOD AND MARKING SYSTEM is flexible and durable to perform most distinguished hardwood/laminate/engineering/parquet flooring shapes with the highest quality levels, along with time control by the performer, not achieved previously or at all; where U.S. Pat. Nos. 6,305,090 and 2,588,757 are limited to its scope (the function is: tile marking system).

SUMMARY OF THE INVENTION

The present invention provides a system that allows the contractor worker and/or the amateur performer to complete the assigned job in a shorter period of time along with higher craftsmanship quality.

Operating the TOOL, METHOD AND MARKING SYSTEM, on surfaces will allow the contractor to perform his/her job with the highest accuracy level along with a shorter period of time.

In a first aspect, the present invention seeks to provide an accurate marking system comprising:

an accurate drawing on a required/working surface aligning ideally to the perpendicular object's surface and/or to the object's surface positioned on the same plane level as the working surface, that may be curved, off angle, or straight;

an accurate shape that will allow after cutting, align ideally to the perpendicular object's surface and/or to the object's surface positioned on the same plane level as the working surface, that may be curved, off angle, or straight;

an accurate shape and size of required surface that will align ideally to the perpendicular object's surface and/or to the object's surface positioned on the same plane level as the working surface, that may be curved, off angle, or straight;

an accurate drawing will be performed on a surface that has a variety of textures (ex. hardwood flooring, laminate flooring, parquet flooring, engineering flooring, or other).

In a second aspect, the present invention seeks to shorten the time spent on the job site by the craftsmen and/or by the professional contractor workers along with the amateur performers. Time is an expensive factor in the present world;

therefore by using the TOOL, METHOD AND MARKING SYSTEM, the working time is automatically shortened.

In a third aspect, the present invention seeks to allow the contractor worker and/or the amateur performer to:
   accept the contract while the job involves difficult cuts;
   allow the worker to perform the job accordingly.

In a fourth aspect, the present invention will help economy by performing jobs in a rapid instance; therefore, more assigned project can be completed in the shorter period of time and by using the TOOL, METHOD AND MARKING SYSTEM.

In a fifth aspect, the present invention will have the advantage of an easy to operate TOOL, METHOD AND MARKING SYSTEM scheme, such as:
   expanding the frame of the structure to the required size;
   decreasing the frame of the structure to the required size;
   easily movable, easy to handle;
   stable during performance of the actual assignment;
   allowing for an accurate reading of the sought shape and/or size of the surface that should align ideally to the adjacent surface;
   allowing any person willing to learn to operate the present invention;
   the device is working in four directions: rightward, leftward, upward, downward.

In a sixth aspect the operator of this so called present invention has the full control over the composition. The TOOL, METHOD AND MARKING SYSTEM, allows the operator to move rightward and/or at the same time upward or downward; furthermore, the operator may move the marking instrument leftward and/or at the same time upward or downward, according to his/her assigned project.

DETAILED DESCRIPTION OF DRAWINGS

Features and advantages of the present invention can be understood in detail; a more particular description of the invention, briefly summarized beneath, may and will reference to the embodiments thereof that are illustrated in the appended drawings. It is to be noted, however, that the appended drawings illustrate the typical embodiments of this invention and are, therefore, not to be considered limiting of its scope, for the invention may admit to other equally effective embodiments.

FIG. 1.1 Represents the TOOL, METHOD AND MARKING SYSTEM, as a complete composition ready to operate—expanded in size.

FIG. 1.2 Represents the TOOL, METHOD AND MARKING SYSTEM, as a complete composition ready to operate—decreased in size.

Figure 4:
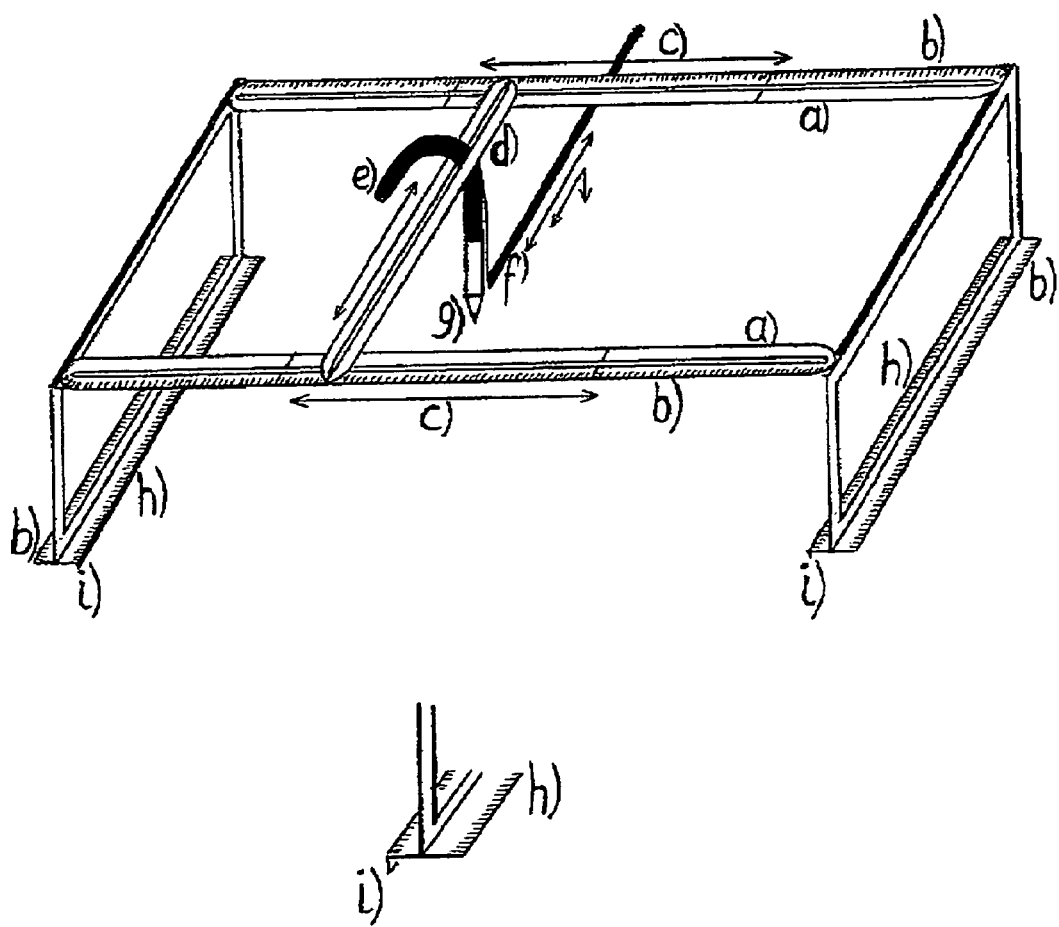

FIG. 4 Represents the frame system of the TOOL, METHOD AND MARKING SYSTEM, along with a mounted marking system into to the sliding tracks; the following are the references to the drawing:
   a) moving sliding tracks,
   b) measuring units,
   c) direction of expansion,
   d) sliding tracks enabling to operate by the marking instrument,
   e) handle,
   f) corresponding instrument,
   g) marking object,
   h) base of the system/frame,
   i) straight holding system.

Figure 5:
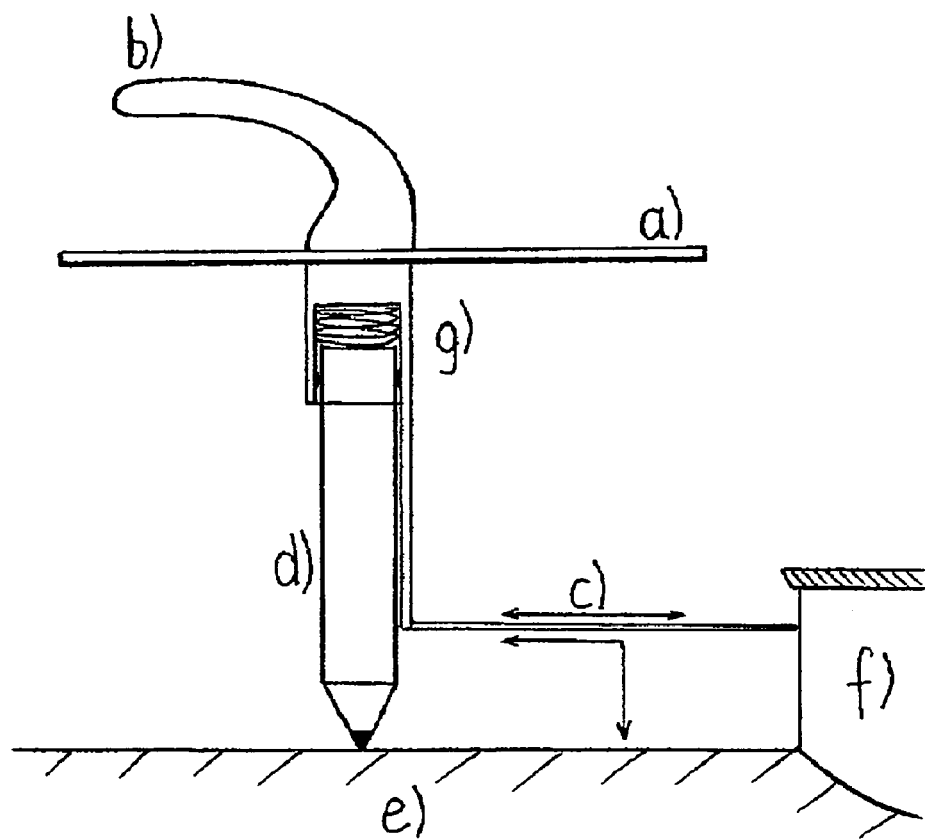

FIG. 5 Represents the marking instrument of the TOOL, METHOD AND MARKING SYSTEM; the following are the references to the drawing:
   a) sliding tracks,
   b) handle,
   c) corresponding instrument,
   d) marking object,
   e) surface to be marked,
   f) adjoining surface to FIG. 5.$e$)
   g) spring affixed inside.

FIG. 6.1 Demonstrates an example of using the TOOL, METHOD AND MARKING SYSTEM, in detail, of using the corresponding instrument in position to transmit the essential line onto the surface adjoining perpendicularly to the object's surface—wood flooring to be adjoined to the bullnose tread step riser; the references are as follows:
   a) sliding tracks,
   b) handle,
   c) corresponding instrument in position to read exact contour of the bullnose tread step riser,
   d) marking object,
   e) wood plank (uninstalled wood flooring),
   f) bullnose tread step riser—perpendicular to the wood flooring.

FIG. 6.2 Demonstrates an example of using the TOOL, METHOD AND MARKING SYSTEM; by marking the wood flooring in order to obtain ideally adjacent, contour and size of the flooring, to the bullnose tread step riser; the references are as follows:
   a) wood flooring already installed,
   b) bullnose tread step riser,
   c) bullnose tread/actual step,
   d) plywood (under layer),
   A starting point of the uninstalled wood plank that should be adjacent to the bullnose tread step riser, FIG. 6.2.$b$),
   B ending point of the uninstalled wood plank that should be adjacent to the bullnose tread step riser, FIG. 6.2.$b$),
   $A_1$ starting point of the bullnose tread step riser, FIG. 6.2.$b$), that should ideally align to point A,
   $B_1$ ending point of the bullnose tread step riser, FIG. 6.2.$b$), that should ideally align to point B,
   C corresponding distance that is sought to align perfectly the uninstalled wood plank to the bullnose tread step riser,
   D the direction of marking object to be moved in order to mark the wood plank.

FIG. 6.3 Demonstrates an example of using the TOOL, METHOD AND MARKING SYSTEM, which shows an ideal contour on the uninstalled wood flooring to be ideally adjacent to the bullnose tread step riser; the references are as follows:
   a) wood flooring already installed,
   b) bullnose tread step riser,
   c) bullnose tread/actual step,
   d) plywood (under layer),
   A starting point of the uninstalled wood plank that should be adjacent to the bullnose tread step riser, FIG. 6.3.$b$), B ending point of the uninstalled wood plank that should be adjacent to the bullnose tread step riser, FIG. 6.3.*b*).

$A_1$ starting point of the bullnose tread step riser, FIG. 6.3.*b*), that should ideally align to point A, $B_2$ ending point of the bullnose tread step riser, FIG. 6.3.*b*), that should ideally align to point B, C corresponding distance that is sought to perfectly align the uninstalled wood plank to the bullnose tread step riser, D exact contour to be cut to adjoin ideally by the wood plank to the bullnose tread step riser.

FIG. 7.1 Demonstrates an example of using the TOOL, METHOD AND MARKING SYSTEM, in detail, of using the corresponding instrument in the position to transmit the essential line onto the surface adjoining the object's surface positioned on the same surface plane as the working surface—wood flooring to be ideally adjoined to the floor nosing; the references are as follows:

a) sliding tracks,
b) handle,
c) corresponding instrument in position to read exact contour of the flooring nosing,
d) marking object,
e) wood plank (uninstalled wood flooring),
f) nosing—the same surface plane as wood flooring.

FIG. 7.2 Demonstrates an example of using the TOOL, METHOD AND MARKING SYSTEM, to mark ideally the wood flooring, to be ideally adjacent to the floor nosing; the references are as follows:

a) wood flooring already installed,
b) nosing,
c) plywood (under layer),

A starting point of the uninstalled wood plank that should be adjacent to the nosing, FIG. 7.2.*b*), B ending point of the uninstalled wood plank that should be adjacent to the nosing, FIG. 7.2.*b*), $A_1$ starting point of the nosing, FIG. 7.2.*b*), that should ideally align to point A, $B_1$ ending point of the nosing, FIG. 7.2.*b*), that should ideally align to point B, C corresponding distance that is sought to align perfectly the uninstalled wood plank to the floor nosing, D the direction of the marking object to be moved in order to mark the wood plank.

FIG. 7.3 Demonstrates an example of using the TOOL, METHOD AND MARKING SYSTEM, which shows ideal contour on the surface of a wood flooring to be ideally adjacent to the floor nosing; the references are as follows:

a) wood flooring already installed,
b) nosing,
c) plywood (under layer),

A starting point of the uninstalled wood plank that should be adjacent to the nosing, FIG. 7.3.*b*), B ending point of the uninstalled wood plank that should be adjacent to the nosing, FIG. 7.3.*b*), $A_1$ starting point of the nosing, FIG. 7.3.*b*), that should ideally align to point A, $B_1$ ending point of the nosing, FIG. 7.3.*b*), that should ideally align to point B, C corresponding distance that is sought to align perfectly the uninstalled wood plank to the nosing, D exact contour, to be cut, to ideally adjoin the wood plank to the nosing.

DETAILED DESCRIPTION OF THE INVENTION

Before explaining the present invention in details, it is to be understood that the invention is not limited to its application to the details of construction and arrangement of part illustrated in the accompanying drawings. Moreover, it is to be understood that the phraseology and terminology employed herein is for the purpose of description and not of limitation.

In accordance with the present invention, and referring to FIG. 1.1 and FIG. 1.2, the composition comprises the complete invention, ready to be used by residential and/or commercial construction workers and/or by amateur users. Wherein FIG. 1.1, shows the expanded form of the invention; FIG. 1.2, illustrates the decrease of the size the object of invention.

Figure 2:
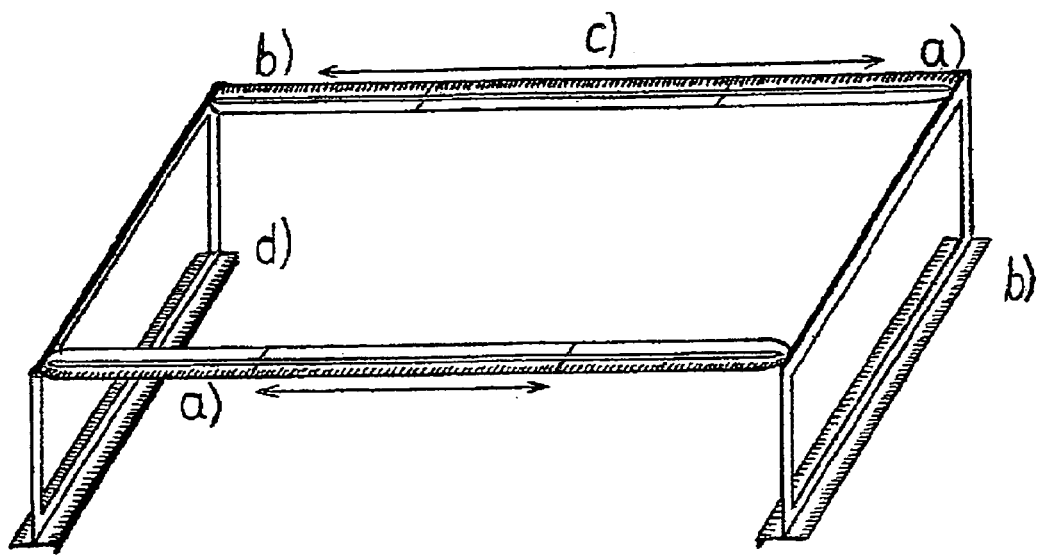
FIG. 2 Represents the frame system of the TOOL, METHOD AND MARKING SYSTEM; the following are the references to the drawing:
   a) pair of sliding tracks (increase and decrease in size),
   b) measuring units,
   c) direction of expansion,
   d) base of the system/frame.

Referring to FIG. 2, wherein the said frame system is made with, but not limited to, metal, plastic or any durable material that will suit the need of demand of the residential and/or commercial and/or amateur contractor use. The frame size will depend on demand of the residential and/or commercial and/or amateur contractor use, although it will be easy to carry and use in its shape and its size. In the example provided in FIG. 2.*d*), the base of the system/frame includes two base holding legs that are positioned parallel to each other. The base of the system/frame comprises measuring units as shown in FIG. 2.*d*), wherein the measuring units reveals as an inch and a cm unit. Moreover, FIG. 2.*d*) is a straight holding system of the surface to be marked accordingly and installed jointly to the object's surface. In addition, the frame system as per FIG. 2.*c*), is adjustable to expand its length to sought size and also regulating to reduce in size to the required dimension. Furthermore, FIG. 2.*c*) comprises measuring units in an inch and a cm unit. The measuring component initiates its unit accordingly from the left side to the right side and at the same time, from the right side to the left side, consequently for the contractor worker to apply accordingly to his/her work order.

Figure 3:
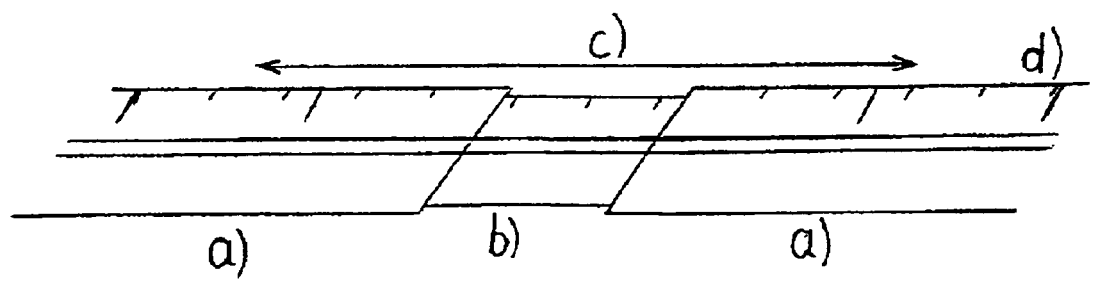
FIG. 3 Represents the expanding and decreasing component of the measuring units within the sliding tracks:
   a) side track,
   b) middle tracks,
   c) direction of expansion,
   d) measuring units.

Referring to FIG. 3, wherein the said two pairs of parallel tracks, mounted onto to the frame system, FIG. 2.*a*), represents an expanding and a decreasing component unit of the composition. Furthermore, FIG. 3, demonstrates measuring units appended into the system, to simplify the actual job performed by residential and/or commercial contractor and/or amateur performer. The system, FIG. 3, will expand to sought size and/or decrease to required dimension inquired by the performer. The middle tracks, FIG. 3.*b*), affixed to side tracks, FIG. 3.*a*), will expand to essential size, while the measurement units will follow each unit consequently and accordingly.

Referring to FIG. 4, wherein the frame system along with mounted marking instrument of the TOOL, METHOD AND MARKING SYSTEM, represents the composition and its essential implication of the invention. Following the frame system described above in "Referring to FIG. 2" the marking instrument, FIG. 5, is mounted into the two sets of parallel to each other tracks by the marking component. Furthermore, the ending component of the tracks, FIG. 5.*a*), is mounted perpendicularly into the tracks, FIG. 4.*a*). Moreover, the affixed component of FIG. 5, to FIG. 4.*a*), can move rightward and leftward along the tracks, FIG. 4.*a*), to its required position. The marking unit affixed into the sliding tracks which are parallel to each other, as well as mounted perpendicularly into tracks mounted to the frame system, is movable upwards and downwards along the tracks as per, FIG. 4. The actual objects of the marking instrument are as follows: FIG. 4.*d*), sliding tracks allowing the marking instrument to operate; FIG. 4.*e*) handle; FIG. 4.*f*), corresponding instrument; FIG. 4.*g*), the marking object. To operate with this invention, the contractor worker and/or amateur performer can easily place the composition on a designated surface; position the sliding tracks, FIG. 4.*d*), by the edge of the frame system in position 0, either rightward or leftward; position the corresponding instrument by the object's surface (object's surface must be touched by the corresponding instrument); further, hold the handle and slowly move either rightward or leftward along the object's surface. The handle moves easily and is ready to trace the contour of the object's surface onto the required surface. Affixed to the handle FIG. 4.*e*), is a marking object FIG. 4.*g*), which at the same time as the contractor worker and/or the amateur user moves the handle, it touches the surface. Although the marking object is attached to the handle system, and occasionally the surface may/will be uneven, the marking object is pushed down by a spring affixed inside of the handle system, FIG. 5.*g*), to provoke the marking object to evenly touch the surface. As the handle is moving in the essential direction, the marking object is touching the surface, and the required contour is transferred, further to be cut to align to the object's surface.

Referring to FIG. 5, wherein the marking instrument is referenced accordingly: FIG. 5.*a*), sliding tracks; FIG. 5.*b*), handle; FIG. 5.*c*), corresponding instrument; FIG. 5.*d*), marking object; FIG. 5.*e*), surface to be marked; FIG. 5.*f*), adjoining surface to FIG. 5.*e*); FIG. 5.*g*), the spring affixed inside of the marking object. The marking instrument performs the essential work. The attached corresponding instrument FIG. 5.*c*), creates essential contour by reflecting object's surface onto the working surface. The corresponding instrument extends its length and/or bends its component to sought size in order to transfer the contour from the object's surface; see FIG. 6.1, and FIG. 7.1, onto the working area/surface. While the residential and/or commercial construction encompasses all sizes and textures of surface, it is essential that corresponding instrument FIG. 5.*c*), extends enough to read the contour in spaces that are narrower than the actual frame of the present invention. The corresponding instrument extends to its sought size and within seconds the transformation can be made. As was mentioned while referring to FIG. 5.*g*), the marking object is pushed down by a spring affixed inside of the handle system to provoke the marking object to touch the surface evenly; therefore, every surface is touched by the marking object to acquire noticeable contour lines for an easy and convenient cut.

Referring to FIG. 6.1, wherein the corresponding instrument is in the position to transfer the contour of the bullnose tread step riser directly onto the uninstalled hardwood plank; furthermore, the purpose is to ideally adjoin hardwood flooring to the bullnose tread step riser.

Referring to FIG. 6.2, wherein the said example comprises the method of the invention obtaining the necessary results on the hardwood flooring. While FIG. 6.2.*a*), is the hardwood flooring already installed, FIG. 6.2.*c*), is the actual bullnose tread/actual step, FIG. 6.2.*b*), is the bullnose tread step riser which is located perpendicularly to the hardwood flooring. While the hardwood flooring is partially installed, FIG. 6.2.*a*), on the left side of the bullnose tread step riser, and the installation is straight, the challenging part is to cut the hardwood planks around the bullnose tread step riser accordingly to its surface. The bullnose tread step riser is round, it is the first step from the bottom, also called as the "bonus step", it is wider than the rest of the stairs, and it is round. FIG. 6.2.*d*), illustrates the plywood (under layer) onto which the hardwood flooring will be nailed/glued down. Consequently to the installed hardwood flooring is placed the uninstalled hardwood plank. Furthermore, over the uninstalled hardwood plank is placed the present invention, FIG. 1.2, ready to perform the assistance for construction worker. The base system of the invention, FIG. 2.*d*), aligns along the installed hardwood planks, letting the uninstalled hardwood plank be placed just next to the installed hardwood flooring. The sliding tracks are moved to the edge of the frame system, FIG. 6.2, to the very left, and/or to position "0" of the measuring unit. The corresponding instrument is extended to the sought size that will read the distance and the contour of the bullnose tread step riser directly onto the hardwood/uninstalled plank. While the essential preparations are achieved, the construction worker and/or the amateur performer is ready to move the handle along the bullnose tread step riser to the right, FIG. 6.2.D. The construction worker and/or amateur performer embraces the TOOL, METHOD AND MARKING SYSTEM, by one hand on the handle and the other hand on the frame system, making sure he/she acquires the exact position. The corresponding instrument is rolling ideally along the bullnose tread step riser without leaving any unwanted marks on the bullnose tread step riser. As the construction worker and/or amateur performer moves the handle rightward ensuring that the corresponding instrument touches the bullnose tread step riser, the marking instrument is moving along the sliding tracks rightward and at the same time along the tracks downward. The movement is unproblematic and slides evenly in both directions, FIG. 4.*a.d*), causing the corresponding instrument to correspond by using the marking object to transform the sought contour of the bullnose tread step riser directly onto the particular hardwood plank. Accordingly, while the contour is transformed, FIG. 6.3.D, the construction worker and/or amateur performer is ready to cut the shape and nail down the hardwood plank on the top of the plywood (under layer). The hardwood flooring acquires required shape to adjoin ideally to the bullnose tread step riser, FIG. 6.3. The action is repeated until the plywood is covered with hardwood flooring to the point where the construction worker and/or amateur performer presumes that the rest of the hardwood flooring may/can be installed without using the present invention on a straight surface.

Referring to FIG. 6.3, wherein the said example embodies the complete reference to the performance around the bullnose tread step riser by using TOOL, METHOD AND MARKING SYSTEM, where the hardwood flooring was the sought surface of the performance. The references to the drawing are as declared in full detail in FIG. 6.3. Although the contour of the object's surface appears difficult to manage, the present invention is equipped with instruments that allow the construction worker and/or amateur performer, to transform ideally the sought contour. As per FIG. 6.3.A-B to FIG. 6.3.$A_1$-$B_1$, the contour on the hardwood plank, FIG. 6.3.D, adjoins perfectly to the bullnose tread riser, FIG. 6.3.*b*).

Referring to FIG. 7.1, wherein the corresponding instrument is in position to transfer the contour of the floor nosing directly onto the uninstalled hardwood plank. The intention is to adjoin the hardwood flooring ideally to the floor nosing already installed.

Referring to FIG. 7.2, wherein the said example comprises the method of the invention obtaining the necessary results on the hardwood flooring. While FIG. 7.2.*a*), is the hardwood flooring already installed, FIG. 7.2.*b*), is the floor nosing, located on the same surface plane as the hardwood flooring, the FIG. 7.2.*c*), is the plywood (under layer) around the floor nosing onto which the hardwood flooring will be nailed/glued down. While the hardwood flooring is partially installed, FIG. 7.2.*a*), to the right and perpendicularly to the floor nosing, and the installation is straight, the challenging part is to cut the hardwood plank around the floor nosing to fit accordingly to its surface. Consequently to the installed hardwood flooring, is placed uninstalled hardwood plank. Furthermore, over the uninstalled hardwood plank is placed the present invention. FIG. 1.2, ready to perform the assistance for a construction worker and/or an amateur performer. The base system of the invention, FIG. 2.*d*), aligns along the installed hardwood planks, letting the uninstalled hardwood plank to be placed just next to the uninstalled hardwood flooring. The sliding tracks are moved to the edge of the frame system, FIG. 7.2, to the very right, and/or to position "0" of the measuring unit and also in this example upward. The corresponding instrument is extended and bent to the sought size that will correspond from the edge of the floor nosing onto the hardwood's uninstalled plank. The corresponding instrument touches the edge of the floor nosing, letting at the same time, the marking object touch the hardwood plank or the edge of the hardwood plank. While the necessary preparations are achieved, the construction worker and/or amateur performer is ready to move the handle along the edge of the floor nosing to the left, FIG. 7.2.D. The construction worker and/or amateur performer embraces the TOOL, METHOD AND MARKING SYSTEM, by one hand on the handle and the other hand on the frame system, making sure he/she acquires the exact position. The corresponding instrument is rolling ideally along the edge of the floor nosing. As the construction worker and/or amateur performer moves the handle leftward, ensuring that the corresponding instrument touches the edge of the floor nosing, the marking instrument is moving along the sliding tracks leftward and at the same time along the tracks downward. The movement is unproblematic and slides evenly in both directions, FIG. 4.*a.d*), causing the corresponding instrument to correspond with the marking object to transform the sought contour of the floor nosing onto this particular hardwood plank. Accordingly, while the contour is transformed, FIG. 7.3.D, the construction worker and/or amateur performer is ready to cut the shape and nail down the hardwood plank on the top of the plywood (under layer). The hardwood flooring acquires required shape to align ideally to the floor nosing, FIG. 7.3. The action is repeated until the plywood is covered with hardwood flooring to the point where the construction worker and/or amateur performer presumes that the rest of the hardwood flooring may/can be installed without using the present invention on a straight surface.

Referring to FIG. 7.3, wherein the said example embodies the complete reference to the performance around the floor nosing and by using TOOL, METHOD AND MARKING SYSTEM, wherein the sought surface is the hardwood flooring. The references to the drawing are as declared in full detail in FIG. 7.3. Although the contour of the object's surface appears difficult to manage (it could appear outward or inward), the present invention is equipped with implements that allow the construction worker and/or the amateur performer to transform ideally the sought contour. As per FIG. 7.3.A-B to 7.3.A$_1$-B$_1$, the contour on the hardwood plank, FIG. 7.3.D, adjoins perfectly to the floor nosing, FIG. 7.3.*b*).

What is claimed is:

1. An apparatus for marking and measuring flooring according to a required shape, such as a contour, comprising:
    a) a frame assembly comprising: a pair of spaced apart, vertical, side members connected at a top end by a pair of horizontal graduated rail members; each side member further comprising a graduated base member at a bottom end thereof; each base member comprising a downwardly extending lip for engaging an adjacent piece of flooring so as to provide a secure and parallel placement of the frame assembly with respect to the adjacent piece of flooring; the horizontal rail members are telescopic allowing an increase or decrease in size of the frame assembly to suit a particular application;
    b) a movable marking assembly comprising: a track slidingly connected at each end to the horizontal rail members to allow for lateral movement thereof; a carriage slidingly connected to the track for longitudinal movement thereof; a longitudinally extending contour following rod rigidly connected to the carriage; a manually movable handle connected to the carriage and extending upward therefrom, and a marking object received in the carriage and extending downwardly therefrom.

2. The marking apparatus of claim 1, wherein said marking object comprises any object capable of marking or scribing said contour on said flooring surface; the movable marking assembly further comprising a spring between said handle and said marking object to allow the marking object to smoothly follow the flooring surface without breaking marking tips, and wherein said contour following rod is extendable and bendable to suit a particular application.

3. A method of using the marking apparatus of claim 2, wherein the lip of said base member is engaged with the adjacent piece of the flooring to ensure parallel alignment of the frame assembly; the horizontal rail members are adjusted to an appropriate size; said contour following rod is extended and bent to suit the particular application; the manually movable handle and the contour following rod are displaced so as to follow the shape of the contour while the marking object is in contact with a piece of flooring to be marked so as to transpose shape of the contour onto the piece of flooring to be marked.

* * * * *